US008717407B2

(12) United States Patent
Kulkarni et al.

(10) Patent No.: US 8,717,407 B2
(45) Date of Patent: May 6, 2014

(54) TELEPRESENCE BETWEEN A MULTI-UNIT LOCATION AND A PLURALITY OF SINGLE UNIT LOCATIONS

(75) Inventors: Hrishikesh G. Kulkarni, Bangalore (IN); Prithvi Ranganath, Bangalore (IN); Raghuram Belur, Bangalore (IN); Sandeep Lakshmipathy, Bangalore (IN)

(73) Assignee: LifeSize Communications, Inc., Austin, TX (US)

(*) Notice: Subject to any disclaimer, the term of this patent is extended or adjusted under 35 U.S.C. 154(b) by 982 days.

(21) Appl. No.: 12/779,533

(22) Filed: May 13, 2010

(65) Prior Publication Data
US 2011/0279633 A1 Nov. 17, 2011

(51) Int. Cl.
*H04N 7/14* (2006.01)
(52) U.S. Cl.
USPC ..................... 348/14.09; 379/93.21
(58) Field of Classification Search
USPC ............... 379/93.21, 158, 202.01, 205.01; 348/14.07–14.1, 211.12; 370/260–266; 455/416
See application file for complete search history.

(56) References Cited

U.S. PATENT DOCUMENTS

| | | | |
|---|---|---|---|
| 5,657,096 A | 8/1997 | Lukacs | |
| 5,675,374 A | 10/1997 | Kohda | |
| 6,795,106 B1* | 9/2004 | Cooper | 348/14.08 |
| 7,692,683 B2 | 4/2010 | Kenoyer et al. | |
| 7,707,247 B2 | 4/2010 | Dunn et al. | |
| 2003/0081112 A1* | 5/2003 | Sheldon et al. | 348/14.09 |
| 2003/0149724 A1* | 8/2003 | Chang | 709/204 |
| 2006/0106929 A1 | 5/2006 | Kenoyer et al. | |
| 2008/0266384 A1* | 10/2008 | Triplicane et al. | 348/14.09 |
| 2008/0267282 A1* | 10/2008 | Kalipatnapu et al. | 375/240.01 |
| 2008/0316296 A1 | 12/2008 | King et al. | |
| 2010/0085419 A1* | 4/2010 | Goyal et al. | 348/14.09 |

OTHER PUBLICATIONS

"Cisco TelePresence Multipoint Switch"; Cisco Systems; 2008; 5 pages.
"Cisco TelePresence System 3000"; Cisco Systems: Obtained from the Internet: <http://www.cisco.com/en/US/products/ps8333/>; Jul. 30, 2010; 1 page.
"Tandberg Telepresence T3/T1"; Tandberg; Oct. 2009; 2 pages.
Gautam Knot, Prithvi Ranganath, Reghuram Belur, and Sandeep Lakshmipathy; U.S. Appl. No. 12/619,426; "Determining a Videoconference Based on Numbers of Participants"; Nov. 16, 2009; 35 pages.

* cited by examiner

Primary Examiner — Fan Tsang
Assistant Examiner — Akelaw Teshale
(74) Attorney, Agent, or Firm — Meyertons Hood Kivlin Kowert & Goetzel, P.C.; Jeffrey C. Hood; Joel L. Stevens

(57) ABSTRACT

Performing a videoconference. The videoconference may be established at a first videoconferencing location between at least three videoconferencing locations. The locations may include the first location, a second location, and a third location. The first location may maintain a plurality of videoconferencing units and the second and third locations may each maintain a single videoconferencing unit. A first videoconferencing unit of the first location acts as a multipoint control unit (MCU) of the videoconference. The MCU may receive respective videoconferencing information from each videoconferencing unit of the videoconference. The MCU may provide active videoconferencing information of an active participant to ones of the videoconferencing units at the second and third locations corresponding to non-active participants. The MCU may provide second and third videoconference information from the videoconferencing units of the second and third locations for presentation at the first location. This provision may be performed independently of the active participant.

15 Claims, 7 Drawing Sheets

TELEPRESENCE BETWEEN A MULTI-UNIT LOCATION AND A PLURALITY OF SINGLE UNIT LOCATIONS

FIELD OF THE INVENTION

The present invention relates generally to videoconferencing and, more specifically, to a method for conducting a telepresence videoconference with single unit locations.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant, as well as a display and speaker(s) to reproduce video and audio received from one or more remote participants. Each videoconferencing system may also be coupled to (or comprise) a computer system to allow additional functionality into the videoconference. For example, additional functionality may include data conferencing (including displaying and/or modifying a document for both participants during the conference).

An emerging trend in videoconferencing is to utilize multiple displays and/or multiple cameras at one or more locations of a videoconference. A multi-screen telepresence setup typically requires the use of a hardware multipoint conferencing unit (MCU) in order to perform the audio/video switching and mixing necessary for such videoconferences to happen. However, these dedicated MCU systems are expensive and hence increase the cost of the multi-screen telepresence deployments significantly. In addition, improved methods are desired for presenting active participants in a videoconference where at least one of the locations employs multi-screen telepresence. Accordingly, improvements in videoconferencing are desired.

SUMMARY OF THE INVENTION

Various embodiments are presented of a system and method for performing a videoconference between a first location with a plurality of conferencing units and a plurality of other locations with single conferencing units.

The videoconference may be initially established, at a first videoconferencing location, between at least three videoconferencing locations (e.g., between the first videoconferencing location and at least two other videoconferencing locations). The first videoconferencing location may include a plurality of displays, a plurality of corresponding video inputs, one or more audio inputs, and a plurality of corresponding videoconferencing units (e.g., codecs). Second and third videoconferencing locations may only include single endpoints, e.g., including one or more respective displays, one or more respective video inputs, a respective corresponding videoconferencing unit (e.g., a single codec), and one or more respective audio inputs. In one embodiment, a first endpoint at the first videoconferencing may act as host or MCU of the videoconference.

Respective videoconferencing information may be received from each videoconferencing unit of the videoconference. For example, the host may receive audio and video information from each videoconferencing unit in the videoconference.

An active participant may be determined for the videoconference, e.g., based on the received videoconferencing information. The active participant may be determined in any of a variety of ways. For example, the participant with the loudest current audio level (or the largest amount of accumulated audio signal energy) may be determined to be the activate participant.

Based on this determination, active videoconferencing information of an active participant may be provided to ones of the videoconferencing units at the second and third videoconferencing locations corresponding to non-active participants. The videoconferencing information may include the audio and video corresponding to the active participant.

Additionally, second and third videoconferencing information from the videoconferencing units of the second and third videoconferencing locations may be provided for presentation at the first videoconferencing location. For example, the second videoconferencing information may be provided for presentation by the first videoconferencing unit of the first videoconferencing location and the third videoconferencing information may be provided for presentation by the second videoconferencing unit of the first videoconferencing location.

The provision of the second and third videoconferencing information to the videoconferencing units of the first videoconferencing location may be performed regardless of the determined active participant. In other words, in one embodiment, since all of the participants at the first location can hear and see each other, and see all of the displays in the first location, the displays at the first location may be dedicated to the second and third locations and may not change throughout the videoconference, regardless of the determined active participant. However, since the participants at the second and third location do not have this ability, the participant at each of these locations may continually switch to viewing/hearing the active participant. However, each location may not view and/or hear the active participant when he is the active participant, and may instead view/hear a previously active participant.

For example, if the active participant is determined to be a videoconferencing unit of the first videoconferencing location, the active videoconferencing information may correspond to that videoconferencing unit. Accordingly, the active videoconferencing information may be provided to both of the videoconferencing units of the second and third videoconferencing locations. In this case, in one embodiment, none of the videoconferencing units of the first videoconferencing location may present the active videoconferencing information of the videoconferencing unit of the first video conferencing location.

Alternatively, if the active participant is determined to be the videoconferencing unit of the second videoconferencing location, the active videoconferencing information (and accordingly, the active participant) may correspond to that videoconferencing unit. Accordingly, the active videoconferencing information may not be provided to the videoconferencing unit of the second videoconferencing location. Instead, the other videoconferencing information (e.g., of a previous active participant) may be provided to the second videoconferencing location. However, the active videoconferencing information may still be provided to the videoconferencing unit of the third videoconferencing location.

Note that the first videoconferencing unit may provide composite video (continuous presence with video images of multiple participants) to one or more of the videoconferencing units (e.g., rather than a single window video view). For example, the first videoconferencing unit may generate one or more composite videos for various ones of the videoconferencing units. In one embodiment, the composite video may comprise video from a plurality of the first videoconferencing unit of the first location, the second videoconferencing unit of the first location, the videoconferencing unit from the second location, or the videoconferencing unit from the third location. For example, for the second videoconferencing unit, a composite video may be generated which includes the first and second units of the first location and the unit from the third location, although other embodiments are envisioned. In some embodiments, the composite video may include other video inputs, e.g., from presentations or other sources (such as computers, DVDs, digital video players, etc.).

Additionally, note that the method described above may be extended to a three unit system at the first participant location and a fourth single unit participant location. Accordingly, the first videoconferencing unit may provide active videoconferencing information to the videoconferencing unit of the fourth videoconferencing location when the active videoconferencing information does not correspond to the fourth videoconferencing location. Additionally, the first videoconferencing unit may provide fourth videoconference information from the videoconferencing unit of the fourth videoconferencing location for presentation at the first videoconferencing location, e.g., by the third videoconferencing unit of the first videoconferencing location. Similarly, the embodiments described above may be extended to n units at the first location and n single units. In further embodiments, through compositing, more than n single units may be accommodated. Additionally, it may be possible to connect more than one multi-unit location together as well as further single unit locations, as desired.

BRIEF DESCRIPTION OF THE DRAWINGS

A better understanding of the present invention may be obtained when the following detailed description is considered in conjunction with the following drawings, in which.

Figure 1:
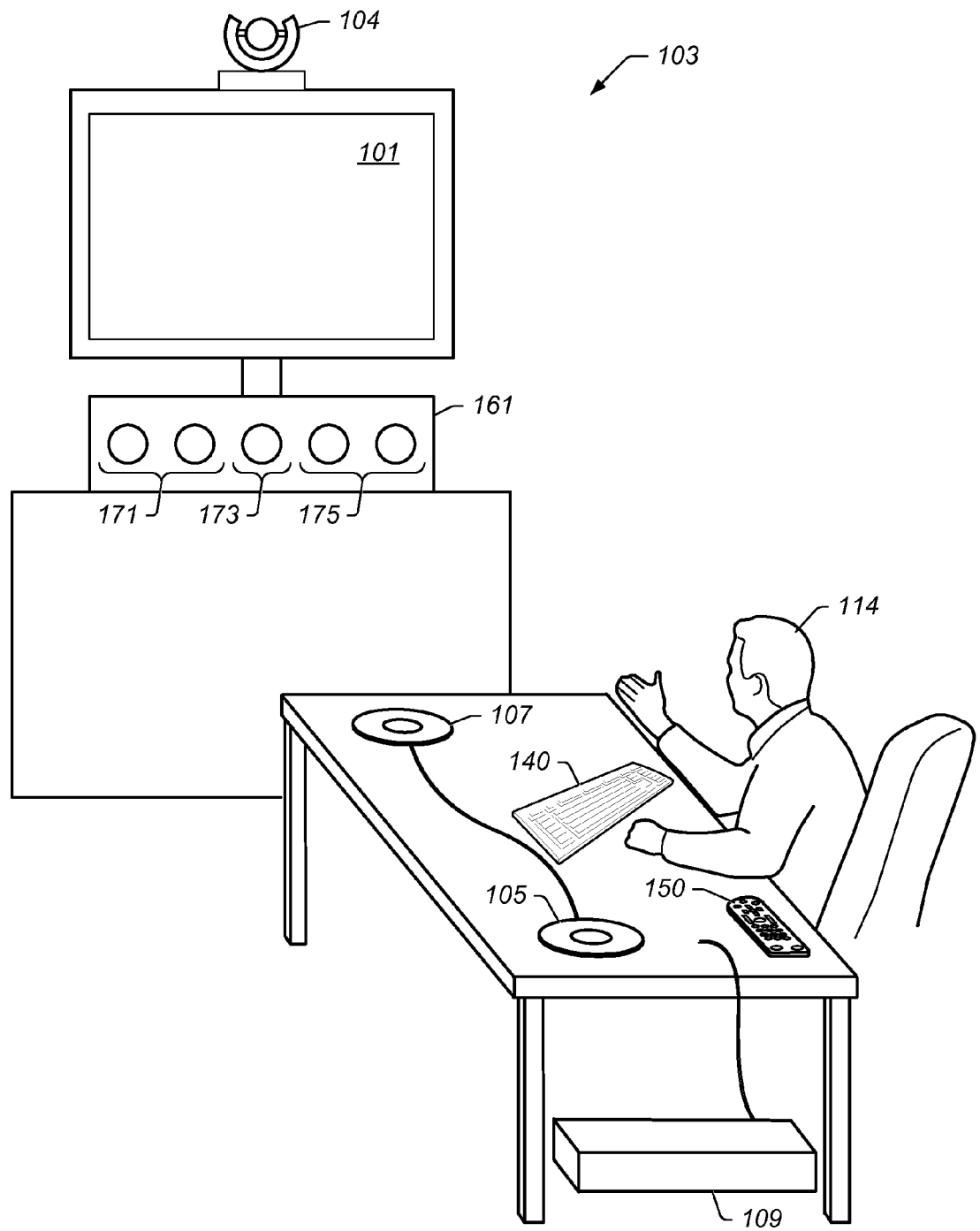
FIGS. 1 and 2 illustrate exemplary videoconferencing system participant locations, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Multiway Telepresence without a Hardware MCU", Ser. No. 12/779,424, whose inventors are Hrishikesh G. Kulkarni, Prithvi Ranganath, Raghuram Belur, and Sandeep Lakshmipathy, is hereby incorporated by reference in its entirety as though fully and completely set forth herein.

Figure 2:

FIGS. 1 and 2—Exemplary Participant Locations

FIG. 1 illustrates an exemplary embodiment of a videoconferencing participant location including a single endpoint. The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference.

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

The videoconferencing systems 103 and 200 are shown as including a single endpoint (e.g., a single codec, display, camera, etc.). In a multi-screen telepresence setup, a videoconferencing location might include multiple such endpoints. For example, a common telepresence setup includes three displays, with corresponding cameras, codecs, and/or other equipment, as desired. The three displays may be placed side-by-side to provide a more realistic feeling of being in the same room for the videoconference participants at each location. Other numbers of endpoints per location and other display setups are also contemplated. For example, one participant or videoconference location may include a telepresence setup which may connect to other participants or videoconference locations which include only a single videoconferencing endpoint.

Figure 3:
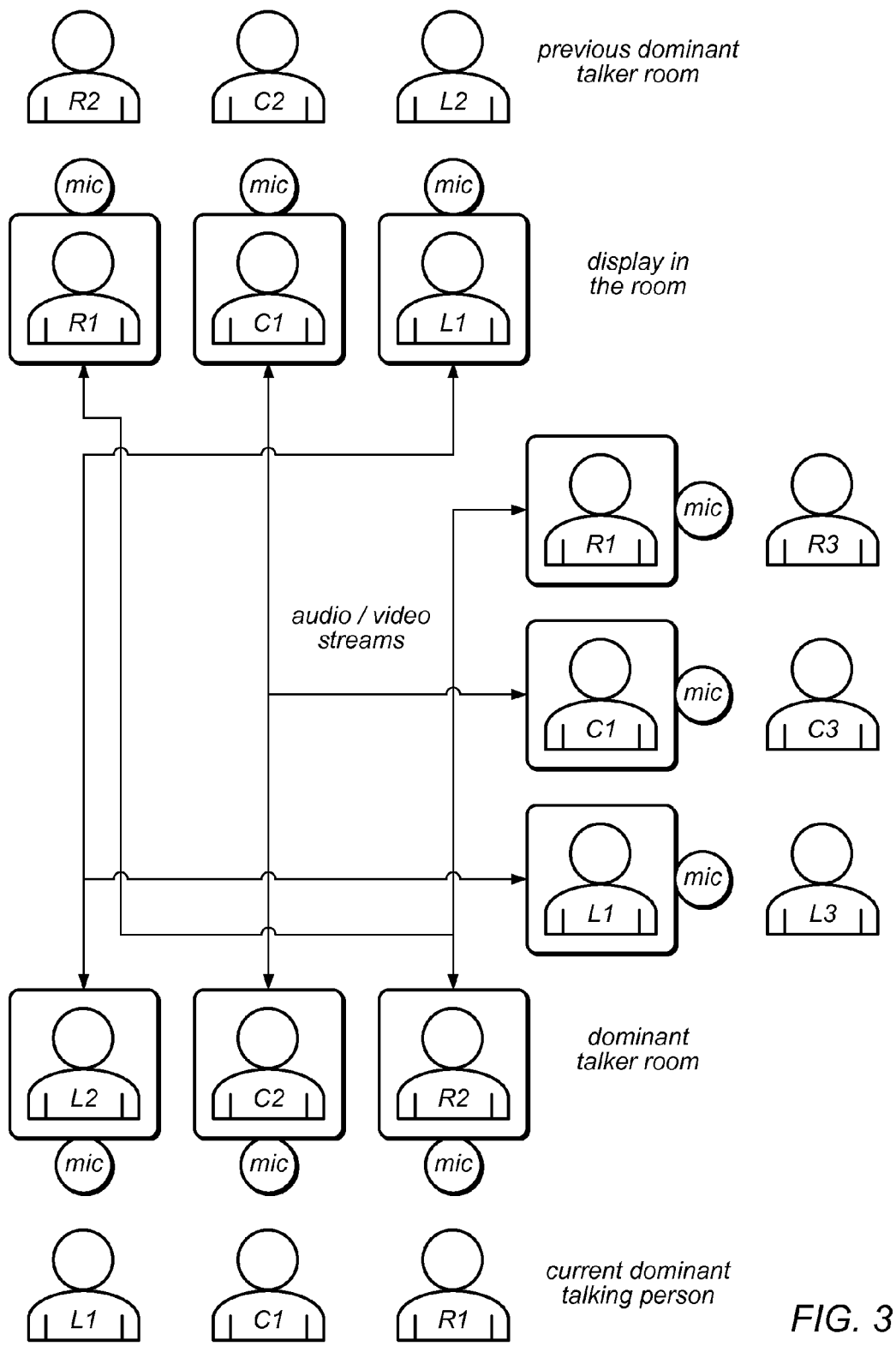
FIG. 3 illustrates a multi-way multi-screen telepresence setup according to one embodiment.

FIG. 3—Multi-Unit Coupled Conferencing systems

FIG. 3 illustrates a multi-screen multi-way telepresence configuration of videoconferencing systems according to one embodiment. As shown, each conferencing location may include multiple endpoints. Thus, the first location may include participant endpoints L1, C1, and R1, while the second and third locations may include participant endpoints L2, C2, R2, and L3, C3, R3 respectively. Each endpoint may include a conferencing unit, such as shown in and described with respect to FIGS. 1 and 2 according to various embodiments. In the exemplary embodiment shown, there are three locations (e.g., rooms), each including three endpoints.

Each endpoint at each location may be coupled to one or more respective endpoints at the other videoconferencing locations. In some embodiments, the endpoints (e.g., the endpoints' codecs) at one location may act as hosts for the respective endpoints at the other locations to which they are coupled. For example, in the exemplary configuration shown in FIG. 3, the endpoints at the first location may act as the host endpoints. Thus, the L2 and L3 endpoints at the second and third locations may both couple to the L1 endpoint, while the C2 and C3 endpoints couple to the C1 endpoint, and the R2 and R3 endpoints couple to the R1 endpoint. In other words, in some embodiments, the telepresence setup shown in FIG. 3 may be accomplished as three separate (but potentially coupled, e.g., as described below) videoconferences.

The endpoints at each location may also be coupled to each other in any of a variety of ways. For example, the codecs of the endpoints at each location may communicate with each other, e.g., in order to determine initial routing of connections between locations. As another example, embodiments are contemplated in which the codecs of the endpoints at each location may each be coupled to an audio mixer, where the audio mixer is configured to mix together audio signals from the endpoints at that location, such that each codec may receive a mixed audio signal including all of the audio signals from that codec's location.

Since there may be at least three videoconferencing locations participating in the videoconference, there may be more video input signals than any single location may be capable of displaying. It may be possible to use dedicated multipoint control hardware to create a composite image (also referred to as a continuous presence image) from multiple video inputs, however, this may in some embodiments be an undesirable solution. More specifically, dedicated multipoint control hardware (i.e., that is separate from the videoconferencing units) may typically be relatively expensive, potentially reducing the feasibility of implementing telepresence systems for some organizations. Instead, one or more of the videoconferencing units may act as the MCU, as described below.

Accordingly, in some embodiments, a switching scheme may be implemented, e.g., in order that each endpoint may display an appropriate video input signal at any given time. According to some embodiments, the multi-screen multi-way telepresence videoconference illustrated in FIG. 3 may be capable of operating in either a "segment switching mode" or a "site switching mode", as described in the U.S. patent application titled "Multiway Telepresence without a Hardware MCU", which was incorporated by reference above. FIG. 3 illustrates an embodiment of site switching where the current dominant talker is in location 1. Accordingly, locations 2 and 3 are both displaying location 1 on all three screens. Location 1 is displaying the previous dominant talkers of location 2.

Figure 4:
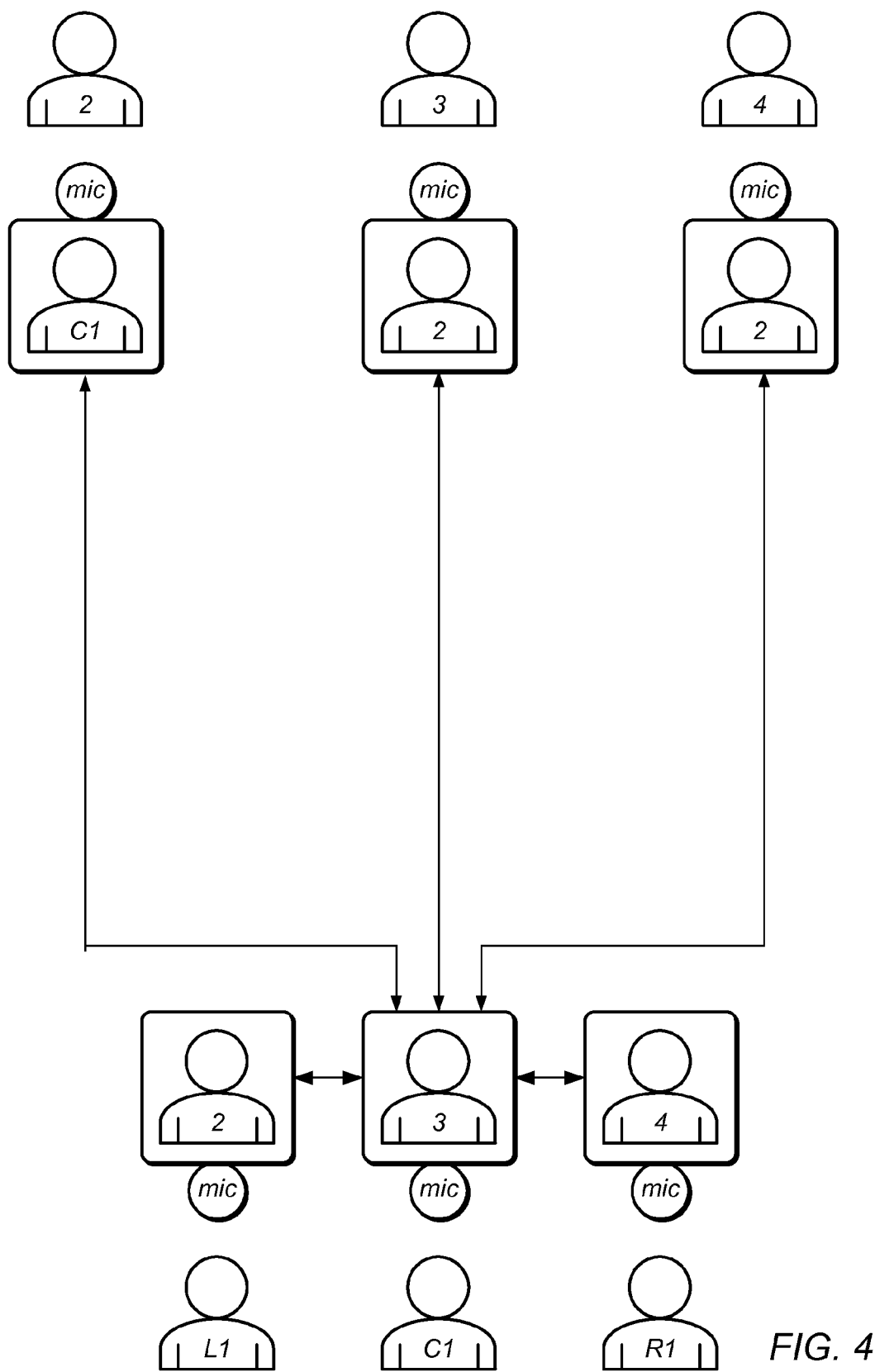
FIG. 4 illustrates coupled single unit and multi-unit conferencing locations for a videoconference, according to one embodiment.

FIG. 4—Single Unit and Multi-Unit Coupled Conferencing Locations

FIG. 4 illustrates a multi-unit telepresence videoconferencing location coupled to a plurality of single unit videoconferencing locations according to one embodiment. The conferencing systems may be operable to perform the methods described herein. As shown, a first location may include participant endpoints L1, C1, and R1, while the second, third, and fourth locations may include single respective participant conferencing endpoints 2, 3, and 4 respectively. Each endpoint at the locations 2, 3, and 4 may be similar to that shown in and described with respect to FIGS. 1 and 2, according to various embodiments. However, the endpoints at location 1 may be similar to that described with respect to FIGS. 3, 5, and 6, among other possible variations. Additionally, each unit may have been associated or coupled to more than one display, video input, video output, audio input, and audio output, as desired. Regardless, locations 2, 3, and 4, may be designed for a single participant with a single videoconferencing unit.

As shown, each endpoint at locations 2, 3, and 4 may be coupled to a host endpoint at the first location, e.g., C1. C1 may act as an MCU for L1, C1, R1, 2, 3, and 4. For example, C1 may forward videoconferencing information between L1 and R1 and locations 2, 3, and 4. More specifically, C1 may receive information from 2 and forward that information for presentation on L1 and may receive information from 3 and forward that information for presentation on R1. For locations 2, 3, and 4, C1 may provide various different audio and video depending on videoconferencing conditions, as described in more detail below.

Alternatively, each endpoint at locations 2, 3, and 4 may be coupled to respective endpoints at location 1. In some embodiments, the endpoints (e.g., the endpoints' codecs) at the first location may act as hosts for the respective endpoints at the other locations to which they are coupled. Thus, L1 may be the host endpoint for L1 and location 2; C1 may be the host endpoint for C1 and location 3; and R1 may be the host endpoint for R1 and location 3. In other words, in some embodiments, the telepresence setup shown in FIG. 4 may be accomplished as three separate (but potentially coupled) videoconferences.

Similar to above, the endpoints at the first location may also be coupled to each other in any of a variety of ways. For example, the codecs of the first location may communicate with each other, e.g., in order to determine initial routing of connections between locations. As another example, embodiments are contemplated in which the codecs of the first endpoint may each be coupled to an audio mixer, where the audio mixer is configured to mix together audio signals from the endpoints at that location, such that each codec may receive a mixed audio signal including all of the audio signals from that codec's location.

Since there may be at least three videoconferencing locations participating in the videoconference, there may be more video input signals than any single location may be capable of displaying (e.g., at locations 2, 3, and 4). It may be possible to create a composite image from multiple video inputs (e.g., for the first location or for all of the other locations for a given location). For example, the center videoconferencing unit may generate composite images for locations 2, 3, and 4. As described herein, the center videoconferencing unit may act as the MCU for all of the remaining videoconferencing units in the videoconference. Further details are provided with respect to FIG. 7 below.

Figure 5:
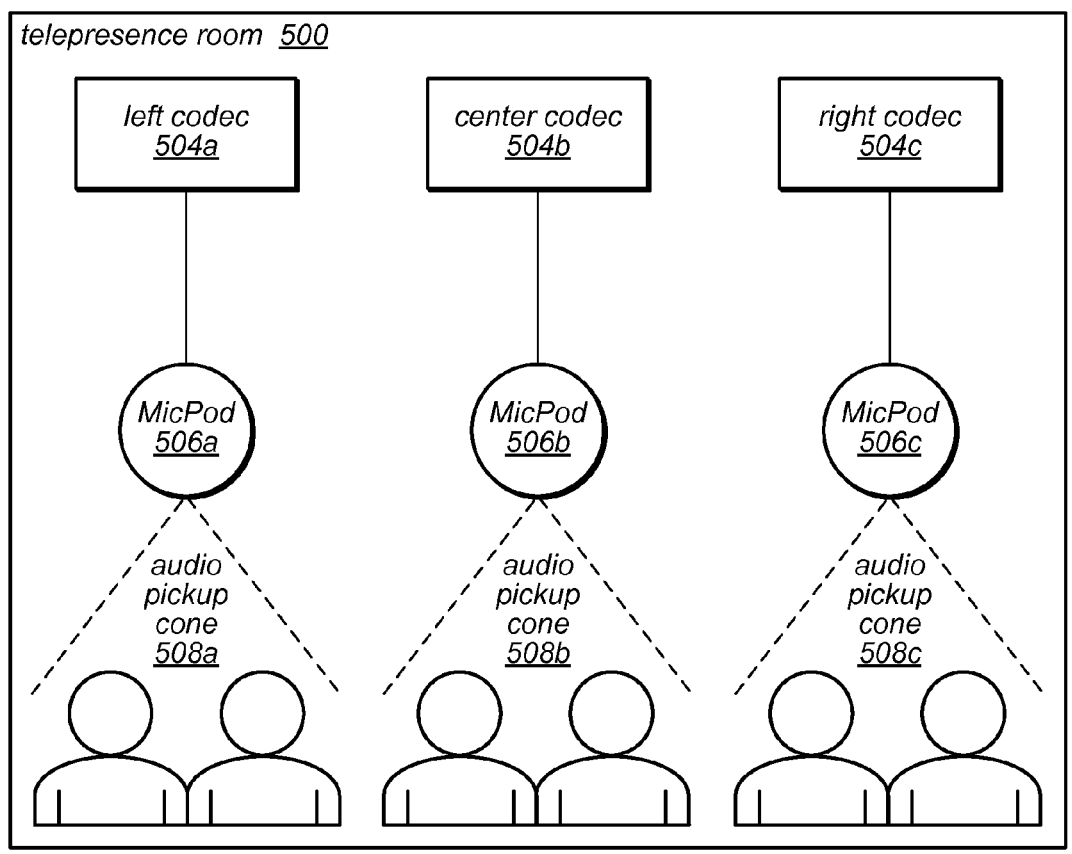
FIGS. 5 and 6 illustrate various embodiments of a three endpoint telepresence room setup.
Figure 6:
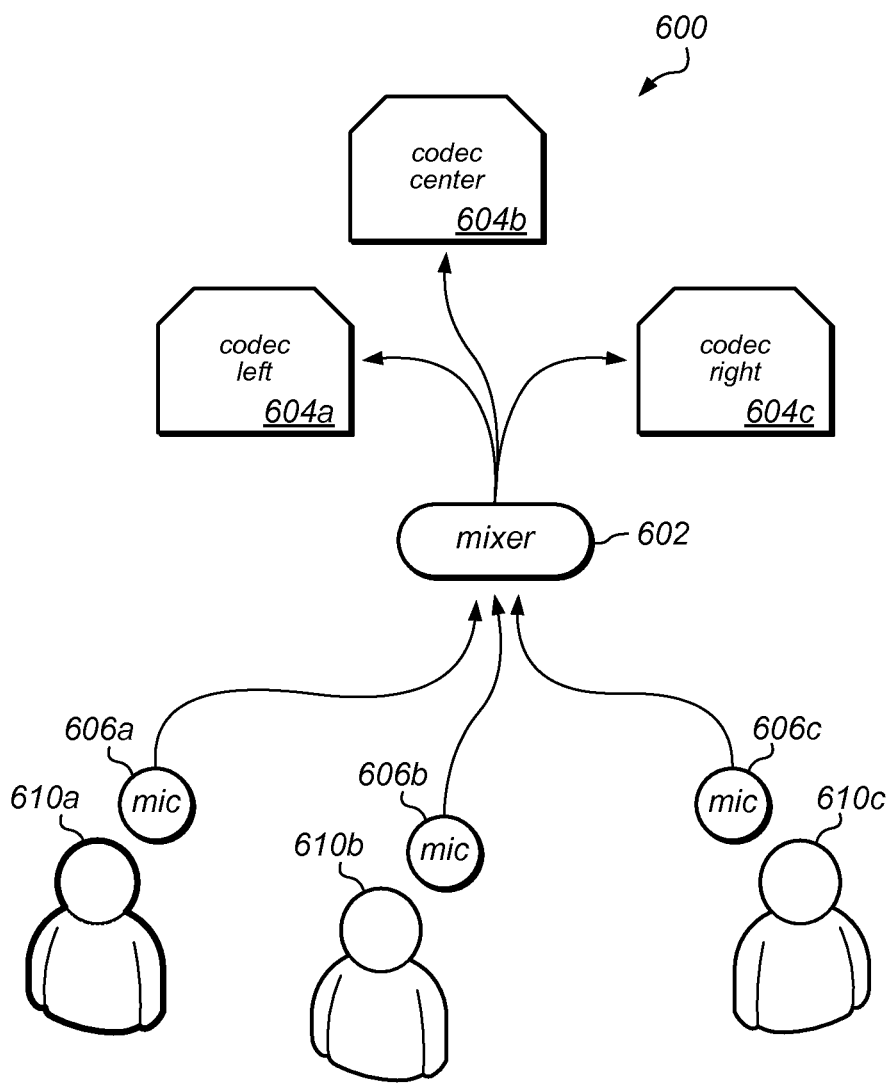

FIGS. 5 and 6—Multi-Unit Room Configuration

FIGS. 5 and 6 illustrate aspects of an exemplary multi-unit (e.g., telepresence) location configuration according to various embodiments. According to some embodiments, the first videoconferencing location of FIG. 4 may be implemented using one or both of the exemplary telepresence room configurations shown in FIGS. 5 and 6, e.g., to implement a method for performing a videoconference according to any of the various embodiments described below with respect to FIG. 7.

In the embodiment of FIG. 5, the telepresence room 500 may include three endpoints: a "left" endpoint, a "center" endpoint, and a "right" endpoint. Each endpoint may include a codec 504, and an audio input 506, such as a microphone or microphone array. Each endpoint may also include a video input (not shown) such as a video camera, a display (not shown) for displaying videoconferencing information from other locations, and any of various other videoconferencing equipment, as desired.

As shown in FIG. 5, each audio input may be configured as a unidirectional audio input e.g., with a directionally oriented "audio pickup cone" 508. It should be noted that although the audio pickup cones 508 are shown as being essentially cone shaped, the actual shape of the audio pickup cone may be any of a variety of shapes; for example, in some embodiments the actual audio pickup field may a cardioid.

By using a unidirectional audio input configuration for each endpoint at a location, it may be possible to isolate corresponding portions of a telepresence room. In other words, if the audio pickup cones 508 of the audio inputs are substantially non-overlapping, a videoconference participant speaking in the audio pickup cones 408a of corresponding MicPod 506a may not produce a noticeable audio input signal in the other MicPods 506b, 506c. This separation of audio inputs may be important in order to allow for the possibility of a segment-switching videoconference configuration, as will be described below.

In some embodiments, the respective audio inputs 506a, 506b, 506c may provide received audio input signals to their respective codecs 504a, 504b, 504c directly as shown in FIG. 5. Alternatively, in some embodiments it may be preferable that the respective audio inputs 506a, 506b, 506c provide received audio input signals to a mixer. An exemplary such embodiment is shown in FIG. 6.

In FIG. 6, participants 610a-c are located within the respective audio pickup cones of audio inputs (e.g., microphone) 606a-c in telepresence room 600. Thus, if participant 610a speaks, audio input 606a should receive an audio input signal, while audio inputs 606b, 606c should not. However, the audio input signals from each of the audio inputs 606a-c may be provided to a mixer 602, which may be configured to mix the received audio input signals to produce a mixed audio signal. The mixed audio signal may retain information indicating from which audio input which audio input signal is received; for example, the mixed audio signal may include respective channels for each of audio inputs 606a-c.

The mixer 602 may further be configured to provide the mixed audio signal to one or more of the codecs in the telepresence room. For example, as shown, the mixer 602 may be configured to provide the mixed audio signal to each of the left codec 604a (e.g., corresponding to the audio input 606a), the center codec 604b (e.g., corresponding to the audio input 606b), and the right codec 604c (e.g., corresponding to the audio input 606c).

Alternatively, in some embodiments the mixer 602 may be configured to provide the mixed audio signal to a subset of the codecs in the telepresence room 600. For example, in some embodiments the mixer 602 may only provide the mixed audio signal to the center codec 604b, which may then provide the mixed audio signal (or a portion thereof) to the left codec 604a and the right codec 604c.

Each codec may be configured to determine, from the mixed audio signal, whether or not its corresponding audio input is receiving an audio signal (e.g., from a participant speaking) This may allow the codec to determine whether a switching condition has occurred. Alternatively, one codec at a location may operate as a "master" codec, e.g., may act as an MCU for all of the videoconferencing units (including the local videoconferencing units). The master codec may determine a switching condition from received audio and provide corresponding video signals for display, described in more detail below.

Figure 7:
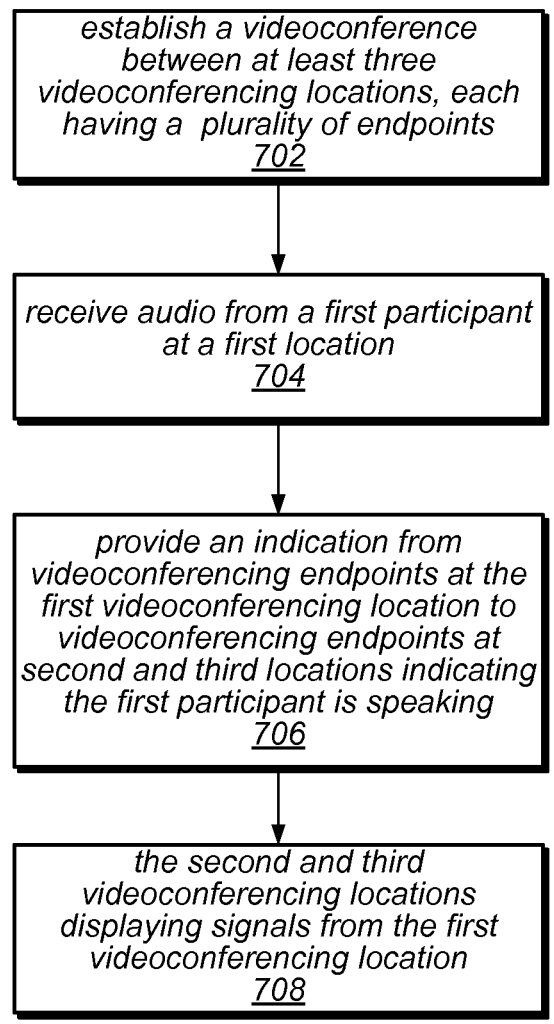
FIG. 7 is a flowchart diagram illustrating exemplary methods for performing a videoconference with a multi-unit conferencing location and a plurality of single unit conferencing locations, according to some embodiments.

FIG. 7—Conducting a Multi-Screen Videoconference

FIG. 7 illustrates embodiments of a method for conducting a videoconference with a multi-screen location with a plurality of single screen locations. The methods shown in FIG. 7 may be used in conjunction with any of the computer systems or devices shown in the above Figures, among other devices. For example, the methods of FIG. 7 may apply to an embodiment where a videoconference is conducted between a plurality of videoconferencing locations, such as shown in FIG. 4. The system, or a portion thereof (e.g., a single location), may be configured to perform the method, as described below. In various embodiments, some of the method elements shown may be performed concurrently, performed in a different order than shown, or omitted. Additional method elements may also be performed as desired. As shown, the method may operate as follows.

In 702, the videoconference may be established, at a first videoconferencing location, between at least three videoconferencing locations (e.g., at least two other videoconferencing locations). The first videoconferencing location may include a plurality of displays, a plurality of corresponding video inputs, and a plurality of corresponding videoconferencing units (e.g., codecs). In some embodiments, the first videoconferencing location may also include a plurality of corresponding audio inputs. The audio inputs may be coupled to mixer (e.g., an audio mixer), which may be coupled to each of the plurality of videoconferencing units. Second and third videoconferencing locations may only include single endpoints, e.g., including one or more respective displays, one or more respective video inputs, a respective corresponding videoconferencing unit, and one or more respective audio inputs.

In one embodiment, the videoconference may be established according to the following descriptions. The first videoconferencing location may include a plurality of videoconferencing units. For example, there may be three videoconferencing units in the first location L1, C1, and R1. At a plurality of other locations, there are only single videoconferencing units.

In one particular embodiment, all the other locations initially attempt to connect (or call) C1 at the first location, although other embodiments are envisioned. For example, a videoconferencing unit (2) at a second location may call C1 (e.g., which may be a controlling endpoint of the first location, e.g., the MCU of the videoconference). In response, C1 may determine that this is a single videoconferencing endpoint location (e.g., through proprietary messaging, 2 may be able to tell C1 that it is a single screen room codec) and accepts the call to itself. Later, a videoconferencing unit (3) at a third location may call C1. In response, C1, determining that 3 is single videoconferencing unit location, and that it already has one call, checks with L1 if it can take a call and if it can, it may forward communications from 3 to L1 for display. Additionally, a videoconferencing unit (4) at a fourth location may call C1. C1, seeing 4 is single screen, and that itself and L1 already are displaying information from 3 and 2 respectively, forwards communication from 4 to R1 for display. This may continue until C1 realizes it can take no more incoming calls from single videoconferencing endpoint locations (e.g., that there are no more remaining screens or videoconferencing units at the first location or that the C1 unit has run out of ports to handle incoming conferences). However, it should be noted that other embodiments are envisioned, e.g., where the L1, C1, and R1 each make a connection with 3, 2, and 4, respectively, e.g., without the information being forwarded through C1. Such connections could be initially handled and transferred from C1 or could be achieved by each remote conferencing unit "calling" or initiating a connection themselves (e.g., or vice versa, from L1 and R1's point of view). In such embodiments, there may not be a master endpoint at the first location.

Thus, in one embodiment, in 702, a first endpoint at the first videoconferencing may act as host or MCU of the videoconference.

In 704, respective videoconferencing information may be received from each videoconferencing unit of the videoconference. For example, C1 (e.g., acting as the MCU) may receive audio and video information from each videoconferencing unit (e.g., videoconferencing units L1, R1, 2, 3, 4, and its own audio and video information). Note that where mixed audio is received for the entirety of the first location, C1 may receive only the mixed audio for the first location instead of individual audio from itself, L1, and R1.

In 706, an active participant may be determined for the videoconference, e.g., based on the information received in 704. The active participant may be determined in any of a variety of ways. For example, the participant with the loudest current audio level may be determined to be the activate participant. Alternatively, the participant with the largest audio energy level (e.g., averaged over a specified amount of time) may be determined to be the active participant. In further embodiments, the participant whose current audio level exceeds a baseline level (for that location or participant) by the largest amount may be determined to be the active participant. Thus, the active participant may be the participant who is speaking (or speaking more loudly) in the videoconference.

In 708, based on the determination of 706, active videoconferencing information of an active participant may be provided to ones of the videoconferencing units at the second and third videoconferencing locations corresponding to non-active participants. The videoconferencing information may include the audio and video corresponding to the active participant.

In 710, second and third videoconferencing information from the videoconferencing units of the second and third videoconferencing locations may be provided for presentation at the first videoconferencing location. For example, the second videoconferencing information may be provided for presentation by the first videoconferencing unit of the first videoconferencing location and the third videoconferencing information may be provided for presentation by the second videoconferencing unit of the first videoconferencing location.

The provision of the second and third videoconferencing information to the videoconferencing units of the first videoconferencing location may be performed regardless of the active participant determined in 706. In other words, in one embodiment, since all of the participants at the first location can hear and see each other, and all of the displays in the first location, the displays at the first location may be dedicated to the second and third locations and may not change throughout the videoconference. However, since the participants at the second and third location do not have this ability, the participant at each of these locations may continually switch to viewing/hearing the active participant. However, each location may not view and/or hear the active participant when he is the active participant, and may instead view/hear a previously active participant.

For example, if the active participant is determined to be a videoconferencing unit of the first videoconferencing location in 706, the active videoconferencing information may correspond to that videoconferencing unit. Accordingly, the active videoconferencing information may be provided to both of the videoconferencing units of the second and third videoconferencing locations. In this case, in one embodiment, none of the videoconferencing units of the first videoconferencing location may present the active videoconferencing information of the videoconferencing unit of the first videoconferencing location.

Alternatively, if the active participant is determined to be the videoconferencing unit of the second videoconferencing location in 706, the active videoconferencing information (and accordingly, the active participant) may correspond to that videoconferencing unit. Accordingly, the active videoconferencing information may not be provided to the videoconferencing unit of the second videoconferencing location. Instead, the other videoconferencing information (e.g., of a previous active participant) may be provided to the second videoconferencing location. However, the active videoconferencing information may still be provided to the videoconferencing unit of the third videoconferencing location.

Note that the first videoconferencing unit may provide composite video to one or more of the videoconferencing units (e.g., rather than a single video screen, as shown in FIG. 4). For example, the first videoconferencing unit may generate one or more composite videos for various ones of the videoconferencing units. In one embodiment, the composite video may comprise video from a plurality of the first videoconferencing unit of the first location, the second videoconferencing unit of the first location, the videoconferencing unit from the second location, or the videoconferencing unit from the third location. For example, for the second videoconferencing unit, a composite video may be generated which includes the first and second units of the first location and the unit from the third location, although other embodiments are envisioned. In some embodiments, the composite video may include other video inputs, e.g., from presentations or other sources (such as computers, DVDs, digital video players, etc.).

Additionally, note that the method described above may be extended to a three unit system at the first participant location and a fourth single unit participant location. Accordingly, the first videoconferencing unit may provide active videoconferencing information to the videoconferencing unit of the fourth videoconferencing location when the active videoconferencing information does not correspond to the fourth videoconferencing location. Additionally, the first videoconferencing unit may provide fourth videoconference information from the videoconferencing unit of the fourth videoconferencing location for presentation at the first videoconferencing location, e.g., by the third videoconferencing unit of the first videoconferencing location. Similarly, the embodiments described above may be extended to n units at the first location and n single units. In further embodiments, through compositing, more than n single units may be accommodated. Additionally, it may be possible to connect more than one multi-unit location together as well as further single unit locations, as desired.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for performing a videoconference, the method comprising:

establishing, at a first videoconferencing location, a videoconference between at least three videoconferencing locations, wherein the at least three videoconferencing locations comprise the first videoconferencing location, a second videoconferencing location, and a third videoconferencing location, wherein the first videoconferencing location maintains a first plurality of videoconferencing units, wherein the second and third videoconferencing locations each maintain a single videoconferencing unit, wherein each videoconferencing unit has a corresponding at least one display and at least one video input, wherein a first videoconferencing unit of the first videoconferencing location acts as a multipoint control unit (MCU) of the videoconference;

the MCU receiving respective video conferencing information from each videoconferencing unit of the at least three videoconferencing locations; and the MCU providing a respective video stream to each of the videoconferencing units of the at least three videoconferencing locations, wherein each of the respective video streams comprises videoconferencing information from a respective one or more of the videoconferencing units of the videoconference, wherein the respective video streams provided to the videoconferencing units of the first videoconferencing location comprise videoconferencing information from only videoconferencing units of other videoconferencing locations, and wherein the respective video streams provided to the videoconferencing units of the first videoconferencing location each comprise videoconferencing information from a different one or more of the videoconferencing units of the videoconference than the respective video streams provided to the others of the videoconferencing units of the first videoconferencing location.

2. The method of claim 1, further comprising:
the MCU determining an active participant at the first videoconferencing location;
wherein the respective video streams provided to the videoconferencing units of videoconferencing locations other than the first videoconferencing location each comprise videoconferencing information from the active participant.

3. The method of claim 1, further comprising:
the MCU determining an active participant at the second videoconferencing location;
wherein one of the respective video streams provided to one of the videoconferencing units of the first videoconferencing location comprises videoconferencing information from the active participant;
wherein the respective video stream provided to the videoconferencing unit of the third videoconferencing location comprises videoconferencing information from the active participant; and wherein the respective video stream provided to the active participant comprises videoconferencing information from only videoconferencing units other than the active participant.

4. The method of claim 1, further comprising initiating the videoconference, wherein said initiating comprises:
the MCU receiving information from the videoconferencing unit of the second videoconferencing location indicating that the second videoconferencing location only includes a single videoconferencing unit;
the MCU receiving information from the videoconferencing unit of the third videoconferencing location indicating that the third videoconferencing location only includes a single videoconferencing unit.

5. The method of claim 1, further comprising:
the MCU providing a composite video to the videoconferencing unit of the second videoconferencing location, wherein the composite video comprises video from a plurality of: the first videoconferencing unit of the first videoconferencing location, a second videoconferencing unit at the first videoconferencing location, and the videoconferencing unit at the third videoconferencing location.

6. A non-transitory computer accessible memory medium storing program instructions for performing a videoconference, wherein the program instructions are executable to:
establish, at a first videoconferencing location, a videoconference between at least three videoconferencing locations, wherein the at least three videoconferencing locations comprise the first videoconferencing location, a second videoconferencing location, and a third videoconferencing location, wherein the first videoconferencing location maintains a first plurality of videoconferencing units, wherein the second and third videoconferencing locations each maintain a single videoconferencing unit, wherein each videoconferencing unit has a corresponding at least one display and at least one video input;
receive respective videoconferencing information from each videoconferencing unit of the at least three videoconferencing locations; and
provide a respective video stream to each of the videoconferencing units of the at least three videoconferencing locations,
wherein each of the respective video streams comprises videoconferencing information from a respective one or more of the videoconferencing units of the videoconference,
wherein the respective video streams provided to the videoconferencing units of the first videoconferencing location comprise videoconferencing information from only videoconferencing units of other videoconferencing locations, and
wherein the respective video streams provided to the videoconferencing units of the first videoconferencing location each comprise videoconferencing information from a different one or more of the videoconferencing units of the videoconference than the respective video streams provided to the others of the videoconferencing units of the first videoconferencing location.

7. The non-transitory computer accessible memory medium of claim 6, wherein the program instructions are further executable to:
determine an active participant at the first videoconferencing location;

wherein the respective video streams provided to the videoconferencing units of videoconferencing locations other than the first videoconferencing location each comprise videoconferencing information from the active participant.

8. The non-transitory computer accessible memory medium of claim 6, wherein the program instructions are further executable to:
   determine an active participant at the second videoconferencing location;
   wherein one of the respective video streams provided to one of the videoconferencing units of the first videoconferencing location comprises videoconferencing information from the active participant;
   wherein the respective video stream provided to the videoconferencing unit of the third videoconferencing location comprises videoconferencing information from the active participant; and
   wherein the respective video stream provided to the active participant comprises videoconferencing information from only videoconferencing units other than the active participant.

9. The non-transitory computer accessible memory medium of claim 6, wherein the program instructions are executable to:
   receive information from the videoconferencing unit of the second videoconferencing location indicating that the second videoconferencing location only includes a single videoconferencing unit;
   receive information from the videoconferencing unit of the third videoconferencing location indicating that the third videoconferencing location only includes a single videoconferencing unit.

10. The non-transitory computer accessible memory medium of claim 6, wherein the program instructions are further executable to:
    provide a composite video to the videoconferencing unit of the second videoconferencing location, wherein the composite video comprises video from a plurality of: a first videoconferencing unit of the first videoconferencing location, a second videoconferencing unit at the first videoconferencing location, and the videoconferencing unit at the third videoconferencing location.

11. A videoconferencing system for use at a first videoconferencing location, the videoconferencing system comprising:
    a first videoconferencing unit, configured to operate as a multipoint control unit (MCU) for a videoconference;
    at least one display coupled to the first videoconferencing unit;
    at least one video input device coupled to the first videoconferencing unit;
    wherein the first videoconferencing unit is configured to:
       establish a videoconference between at least a second videoconferencing unit at the first videoconferencing location, a videoconferencing unit at a second videoconferencing location, and a videoconferencing unit at a third videoconferencing location, wherein the second and third videoconferencing locations each maintain a single videoconferencing unit, wherein each videoconferencing unit has a corresponding at least one display and at least one video input;
       receive video input from a first participant via the at least one video input device;
       generate videoconferencing information from the video input;
       receive respective videoconferencing information from each videoconferencing unit of the at least three videoconferencing locations;
       provide a respective video stream to each videoconferencing unit of the at least three videoconferencing locations,
          wherein the providing a respective video stream to each videoconferencing unit includes providing a respective video stream to the at least one display coupled to the first videoconferencing unit,
          wherein each of the respective video streams comprises videoconferencing information from a respective one or more of the videoconferencing units of the videoconference,
          wherein the respective video streams provided to the videoconferencing units of the first videoconferencing location comprise videoconferencing information from only videoconferencing units of other videoconferencing locations, and
          wherein the respective video streams provided to the videoconferencing units of the first videoconferencing location each comprise videoconferencing information from a different one or more of the videoconferencing units of the videoconference than the respective video streams provided to the others of the videoconferencing units of the first videoconferencing location.

12. The videoconferencing system of claim 11, wherein the first videoconferencing unit is further configured to:
    determine an active participant at the first videoconferencing location;
    wherein the respective video streams provided to the videoconferencing units of videoconferencing locations other than the first videoconferencing location each comprise videoconferencing information from the active participant.

13. The videoconferencing system of claim 11, wherein the first videoconferencing unit is further configured to:
    determine an active participant unit at the second videoconferencing location;
    wherein one of the respective video streams provided to one of the videoconferencing units of the first videoconferencing location comprises videoconferencing information from the active participant unit;
    wherein the respective video stream provided to the videoconferencing unit of the third videoconferencing location comprises videoconferencing information from the active participant unit; and
    wherein the respective video stream provided to the active participant unit comprises videoconferencing information from only videoconferencing units other than the active participant unit.

14. The videoconferencing system of claim 11, wherein the first videoconferencing unit is further configured to:
    receive information from the videoconferencing unit of the second videoconferencing location indicating that the second videoconferencing location only includes a single videoconferencing unit;
    receive information from the videoconferencing unit of the third videoconferencing location indicating that the third videoconferencing location only includes a single videoconferencing unit.

15. The videoconferencing system of claim 11, wherein the first videoconferencing unit is further configured to:
    provide a composite video to the videoconferencing unit of the second videoconferencing location, wherein the composite video comprises video from a plurality of: the first videoconferencing unit, the second videoconferencing unit at the first videoconferencing location, and the videoconferencing unit at the third videoconferencing location.

* * * * *